(12) United States Patent
Hall et al.

(10) Patent No.: US 6,591,228 B1
(45) Date of Patent: Jul. 8, 2003

(54) CENTRALIZED DIAGNOSTIC LOGGING SERVICE

(75) Inventors: Ian G. Hall, San Francisco, CA (US); Bernard F. Clark, Alameda, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 200 days.

(21) Appl. No.: 09/782,901

(22) Filed: Feb. 13, 2001

(51) Int. Cl.[7] .......................... G06F 17/30; G06F 17/40
(52) U.S. Cl. ...................... 702/187; 370/321; 707/200
(58) Field of Search ................................ 702/182, 183, 702/184, 185, 187, 188; 701/29, 33; 707/200; 709/220, 250, 227; 370/321

(56) References Cited

U.S. PATENT DOCUMENTS 4,625,308 A * 11/1986 Kim et al. .................. 370/321
5,737,600 A * 4/1998 Geiner et al. ............... 707/200

* cited by examiner

Primary Examiner—John Barlow
Assistant Examiner—John Le
(74) Attorney, Agent, or Firm—Fenwick & West LLP

(57) ABSTRACT

A logging service logs diagnostic messages from applications executing in a mainframe computing environment to a centralized log. A mainframe computing environment has a plurality of mainframes coupled to a coupling facility. The coupling facility has a data storage area called a "logstream." Each mainframe has one or more subsystems executing applications. Each application preferably contains an API block, which is populated by the application and passed to a logging service API when the application desires to store a diagnostic message in the logstream. The logging service API writes the diagnostic messages to the logstream. In one subsystem, the logging service API contacts an alert facility in response to certain diagnostic messages received from applications. The logging service API in this subsystem also uses a message queue to pass the diagnostic messages to a subsystem able to write to the logstream.

22 Claims, 3 Drawing Sheets

CENTRALIZED DIAGNOSTIC LOGGING SERVICE

BACKGROUND OF THE INVENTION

1. Field of the Invention

This invention pertains in general to data processing utilizing mainframe computer systems and in particular to diagnostic logging in such computer systems.

2. Description of Background Art

An entity that performs large amounts of data processing, such as a corporation handling a large number of daily transactions, typically relies on mainframe computer systems to perform the data processing. Not long ago, an entity could rely on a single, or only a few mainframe computers to perform all of its data processing. Each mainframe computer typically executed two or three different processing subsystems, each of which executed one or more applications. Each subsystem maintained its own diagnostic log. When a particular application generated a diagnostic message, it was relatively easy for a technician to determine which application in which subsystem generated the message, find the log associated with that subsystem, and examine the messages in the log.

Now, however, data processing needs have increased to the point where an entity such as a corporation may require dozens of mainframe computers to meet its data processing needs. The number of subsystems and applications typically executed by each mainframe computer has also increased. When an application generates a diagnostic message, it is very difficult for a technician to locate the log for that subsystem. Moreover, it is difficult for the technician to determine if other applications in other subsystems have generated the same message. Therefore, there is a need for a way to quickly and conveniently review the diagnostic logs of multiple subsystems executing on multiple mainframe computers.

BRIEF SUMMARY OF THE INVENTION

The above need is met by a logging service that logs diagnostic messages from applications executing on the various mainframe computer subsystems to a centralized log. In an embodiment of the present invention, a mainframe computing environment has a plurality of mainframes coupled to a coupling facility. The coupling facility has a data storage area called a "logstream." A preferred embodiment of the present invention uses the logging service to store diagnostic messages in the logstream. Since the diagnostic messages are centrally stored, a person can easily review diagnostic messages from multiple applications by reviewing the data in the logstream.

Each mainframe preferably executes the OS/390 operating system, also referred to as "MVS" (for Multiple Virtual Storage). Under MVS, each computer can execute one or more subsystems. One subsystem is the online transaction processing (OLTP) subsystem. In general, the OLTP subsystem executes short transactions that need to be performed right away, such as stock trading transactions. Another subsystem is the batch subsystem, which performs transactions that take a relatively long time to complete and do not need to be performed right away. For example, accounting and backup processes that can execute over long periods of time late at night can be performed on the batch subsystem.

Zero or more applications execute within a subsystem. Each application preferably contains an application program interface (API) block, which is a data structure populated by the application when the application generates a diagnostic message. The API block is associated with a logging service API in the subsystem. The application generates a diagnostic message by passing the populated API block to the logging service API.

The logging service API in the subsystem is configured to store diagnostic messages in the logstream 116. The logging service API in the OLTP subsystem is preferably connected to an alert facility. The alert facility signals an alert to an automated system and/or a human operator of the computing environment in response to certain diagnostic messages generated by the applications. In addition, the logging service API is preferably coupled to a message queue. The message queue is utilized because the version of the OS/390 operating system used by one embodiment of the present invention does not allow direct writes to the logstream from the OLTP subsystem. Therefore, the logging service API uses the message queue to pass the diagnostic messages to a subsystem that allows logstream access. Preferably, an application executing as a long-running started batch task drains the message queue and writes the diagnostic messages to the logstream in the coupling facility.

One embodiment of the present invention includes a report and extract utility for extracting data from the logstream based on user-defined criteria. One embodiment also includes an interactive browser utility that allows a user to browse real-time logstream data.

In one embodiment, the operation of the present invention is as follows. Upon receiving a diagnostic message in the form of a populated API block from an application, the logging service preferably validates the header information in the block. Preferably, only messages having valid header information are logged. Next, the logging service determines whether there are any missing fields in the API block that can be populated by the logging service. The logging service also determines whether the block was received from an application executing in either the OLTP or batch subsystem. If the block was received from an application in the batch subsystem, then the logging service preferably writes the diagnostic message directly to the logstream. If the logging service received the diagnostic message from an application in the OLTP subsystem, the logging service preferably writes the message into the message queue. The logging service also checks the message and notifies the alert service if necessary.

DETAILED DESCRIPTION OF THE INVENTION

Figure 1:
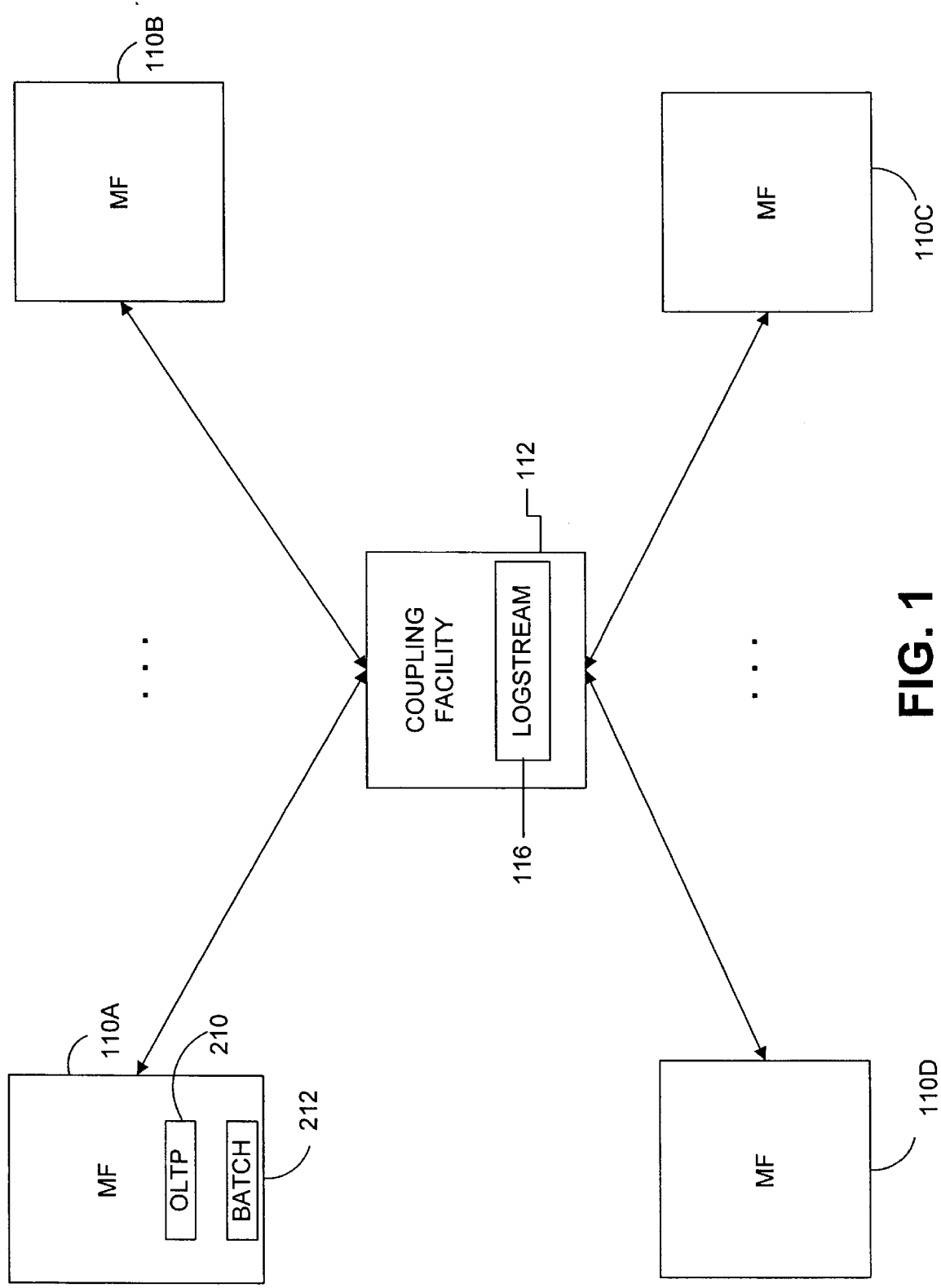
FIG. 1 is a high-level block diagram illustrating a mainframe computing environment according to an embodiment of the present invention.

FIG. 1 is a high-level block diagram illustrating a mainframe computing environment according to an embodiment of the present invention. Illustrated are four mainframe computers (sometimes referred to herein as "mainframes") 110A–D, each coupled to a coupling facility 112. Although only four mainframes 110 are illustrated, embodiments of the present invention can have any practical number of mainframes coupled to the coupling facility 112. A mainframe 110 is a large, powerful computer, in contrast to personal and mini- computers. Exemplary mainframes 110 include the Z900 computer from IBM Corp. and the SKYLINE TRINIUM computer from Hitachi, Ltd. The present invention can also be utilized with non-mainframe computer systems.

Each mainframe preferably executes the OS/390 operating system, also referred to as "MVS" (for Multiple Virtual Storage). OS/390 enables open, distributed processing and allows multiple MVS's to execute on a single mainframe. Each MVS is essentially a separate, logical computer system. Each MVS preferably executes one or more subsystems. FIG. 1 illustrates an online transaction processing (OLTP) subsystem 210 and a batch subsystem 212 executing within mainframe 110A.

The coupling facility 112 is in communication with each of the mainframes 110 and provides fault tolerant capabilities to the computing environment. In one embodiment, the coupling facility 112 is utilized as an arbitrator or tie-breaker for computations performed in parallel by multiple MVS's. Physically, the coupling facility 112 is typically implemented by a mainframe executing a specialized version of OS/390. In one embodiment, a second coupling facility (not shown) shadows the operations of the first in order to provide additional fault tolerance.

The coupling facility 112 has a data storage area called a "logstream" 116. The logstream 116 can be implemented using a combination of magnetic media, electronic circuitry, and/or other forms of computer-readable memories. However, the exact configuration of the logstream 116 is not relevant to the present invention. The logstream 116 typically acts as an information store for the coupling facility 112. For example, the logstream 116 can record logs of transaction flows in order to allow database transactions to be backed-out and to support other functions performed by the coupling facility 112.

A preferred embodiment of the present invention includes a logging service that stores diagnostic messages generated by applications executing in subsystems of the mainframes 110 in the logstream 116. Since the diagnostic messages are centrally stored, a person can easily review diagnostic messages from multiple applications by viewing the the logstream.

Figure 2:
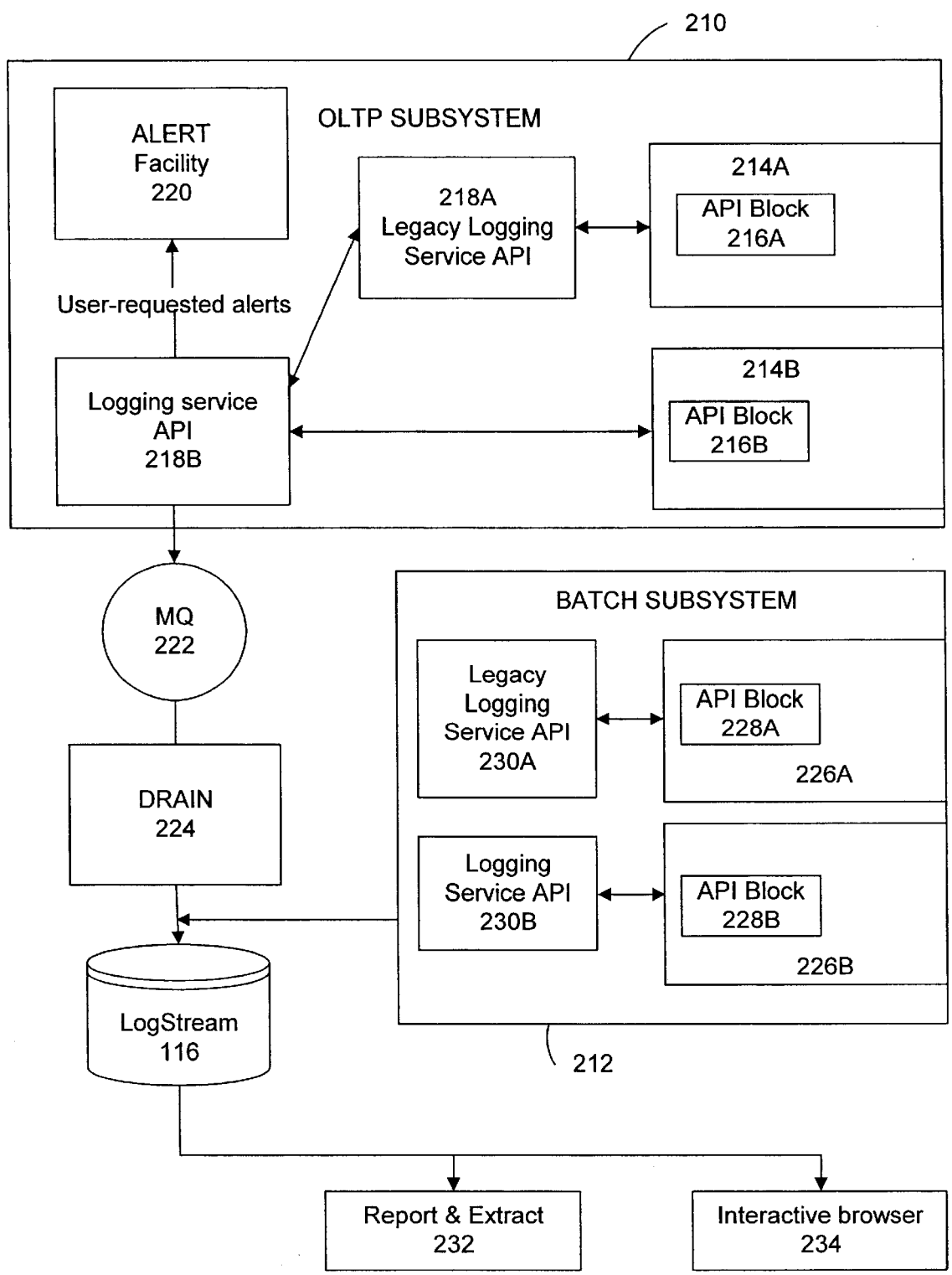
FIG. 2 is a block diagram illustrating a lower-level view of the computing environment of FIG. 1.

FIG. 2 is a block diagram illustrating a lower-level view of the computing environment of FIG. 1. FIG. 2 illustrates the two subsystems 210, 212 of FIG. 1 in communication with the logstream 116. In general, the OLTP subsystem 210 executes short transactions that need to be performed right away, such as stock trading transactions. In a preferred embodiment of the present invention, the functionality of the OLTP subsystem 210 is provided by the CICS software product available from International Business Machines Corp. The second subsystem is the batch subsystem 212. In general, the batch subsystem 212 performs transactions that take a relatively long time to complete and do not need to be performed right away. For example, accounting and backup processes that can execute over long periods of time late at night can be performed on the batch subsystem 212.

In FIG. 2, the OLTP subsystem 210 is executing two applications 214A, 214B. Those having skill in the art will recognize that the number of applications executed by a subsystem can and will vary. Moreover, the exact functions performed by the applications are not relevant to the present invention, except for the functionality related to the logging service as described herein.

An API block 216 is within each application 214. The API block 216 is a data structure populated by the application 214 when the application desires to store a diagnostic message in the logstream 116. Diagnostic messages generally describe the state of the application 214 and may indicate that an application has encountered a fault, completed a task, detected an error, or any other information that may be useful to application developers, system administrators, or anyone else responsible for maintaining the computing environment. An application 214 can generate a diagnostic message at any time.

The following table describes the structure of the API block 216 according to one embodiment of the present invention. Those of ordinary skill in the art will recognize that alternative embodiments of the present invention can vary the structure of the API block 216.

LOGGING SERVICE API BLOCK STRUCTURE

| Level | Argument Name | Format | Description |
|---|---|---|---|
| 1 | LOG-API | Structure | Message Block, which includes the following fields: |
| 2 | LOG-SERVICE-DATA | Structure | Details of the Logging Service |
| 3 | LOG-SERVICE-NAME | PIC X(16) | The name of the Common Technical Service. This is preferably a constant: 'LOGGING'. |
| 3 | LOG-MAJOR-VERSION | PIC 9(02) | The Major Version Number of the logging service. This is preferably a constant. Value depends on version. |
| 3 | LOG-MINOR-VERSION | PIC 9(02) | The Minor Version Number of the logging service. This is preferably a constant. Value depends on version. |
| 2 | LOG-MODULE-NAME | PIC X(08) | This is preferably a constant 'COVLOG10'. |
| 2 | LOG-RTRN-CODE | PIC 9(04) | The Proc return Code. PROC-SUCCESS VALUE 0 PROC-FATAL-ERROR VALUE 90 |

-continued

LOGGING SERVICE API BLOCK STRUCTURE

| Level | Argument Name | Format | Description |
|---|---|---|---|
| 2 | LOG-RETURN-DETAIL | PIC X(04) | LOG-WARNING VALUES; '0010' THRU '0999' LOG-ERROR VALUES '1000' THRU '9999' LOG-INVALID-VERSION VALUE '1000' LOG-NO-EVENT-TYPE VALUE '1001' LOG-BAD-ALERT-IND VALUE '1002' LOG-BAD-DEBUG-IND VALUE '1003' LOG-BAD-LONG-MSG-IND VALUE '1004' LOG-BAD-LONG-MSG-LEN VALUE '1005' LOG-GENLOG-FAILED VALUE '2000' LOG-ALERT-FAILED VALUE '3000' LINK-ALERT-FAILED VALUE '3001' LOG-DEBUG-FAILED VALUE '4000' LOG-CICS-ERROR VALUE '5000' LOGLINK-FAILED VALUE '5001' NOT-AUTHORIZED VALUE '5002' LOG-LOGGING-DISABLED VALUE '9999'. |
| 2 | LOG-MESSAGE-HEADER | Structure | The 'Fixed' data relating to the logged event |
| 3 | LOG-PROD-DELIV-CH | PIC X(02) | Client's Product Delivery Channel, if known. |
| 3 | LOG-BUS-SVCE | PIC X(08) | The Business Service related to the calling module. |
| 3 | LOG-ON-BEHALF-BUS-SVCE | PIC X(08) | The Business Service from which the caller was invoked |
| 3 | LOG-PGM-NAME | PIC X(08) | The name of the calling module. |
| 3 | LOG-USER-ID | PIC X(20) | The current UserID that invoked the business service |
| 3 | LOG-UOW-TOKEN | PIC X(32) | The Unit of Work Token for end-to-end tracing |
| 3 | LOG-TRACE-DATA | Structure | Sub-structure within Message-Header Occurs 3 times This structure contains user-defined event trace variables. |
| 4 | LOG-TRACE-LABEL | PIC X(10) | User-supplied Name/Key of the Trace Variable |
| 4 | LOG-TRACE-VALUE | PIC X(20) | User-supplied Trace data |
| 2 | LOG-MESSAGE-DATA | Structure | Describes the actual Event |
| 3 | LOG-EVENT-TYPE-CODE | PIC X(02) | An Event classification code. The user has the freedom to define new event classifications. SYSTEM-ERROR VALUE 'S1' SYSTEM-WARNING VALUE 'S2' SYSTEM-INFO VALUE 'S3' BUSINESS-REJECT VALUE 'B1' BUSINESS-WARNING VALUE 'B2' BUSINESS-INFO VALUE 'B3' AUDIT-REJECT VALUE 'A1' AUDIT-WARNING VALUE 'A2' AUDIT-INFO VALUE 'A3' INFO-PUB-API-INVOKED VALUE 'I1' INFO-PRIV-API-INVOKED VALUE 'I2' INFO-DB-API-INVOKED VALUE 'I3' INFO-MODULE-INVOKED VALUE 'I4' INFO-PUBLIC-API-TERM VALUE 'I5' INFO-PRIVATE-API-TERM VALUE 'I6' INFO-DB-API-TERM VALUE 'I7' INFO-MODULE-TERM VALUE 'I8' INFO-STATEMENT VALUE 'I9'. |
| 3 | LOG-ALERT-IND | PIC X(01) | Determines if ALERT must be generated (Y/N) |
| 3 | LOG-ALERT-MSG-ID | PIC X(08) | Message ID used by Mainframe Alert Service This ID is associated with a specific ALERT action to be taken by the Alert facility when this ID is detected. |
| 3 | LOG-DEBUG-IND | PIC X(01) | Not used. |
| 3 | LOG-SHORT-MSG-TX | PIC X(60) | Fixed length short message |
| 3 | LOG-APPL-CD | PIC X(02) | Owning application of Message ID |
| 3 | LOG-APPL-MSG-ID | PIC 9(05) | Message ID of message |

-continued

LOGGING SERVICE API BLOCK STRUCTURE

| Level | Argument Name | Format | Description |
| --- | --- | --- | --- |
| 3 | LOG-LONG-MSG-IND | PIC X(01) | Determines if a long message is being passed as a parameter. See LOG-MESSAGE-AREA and LOG-MESSAGE-LEN-QY. The following data is optional |
| 3 | LOG-MESSAGE-LEN-QY | PIC 9(05) | Defines length of variable-length message (1 to 32,000) |

The API block 216 is associated with a logging service API 218 in the OLTP subsystem 210. An application 214 generates a diagnostic message by calling the logging service API 218 with the populated API block 216.

In FIG. 2, the OLTP subsystem 210 has two logging service APIs, labeled 218A and 218B. Logging service API 218A is a legacy logging service called by legacy applications developed before the advent of the present invention. Logging service API 218B is configured to store diagnostic messages in the logstream 116 and is preferably called by applications developed after the advent of the present invention. In one embodiment of the present invention, the legacy logging service API 218A is altered to pass calls from legacy applications to the other logging service API 218B. This technique allows the present invention to support legacy applications without requiring the legacy applications to be modified. Of course, if no legacy applications are present there is no need for the legacy logging service API 218A.

The logging service API 218B in the OLTP subsystem 210 is preferably connected to an alert facility 220. The alert facility 220 signals an alert to an automated system and/or a human operator of the computing environment in response to certain diagnostic messages generated by the applications. In one embodiment of the present invention, an application can activate the alert facility 220 by setting the LOG-ALERT-IND field in the API block 216 to "true." In addition, the application can specify an action to be performed by the automated system by setting the LOG-ALERT-MSG-ID field.

In addition, the logging service API 218 is preferably coupled to a message queue 222. The message queue 222 is utilized because the version of the OS/390 operating system used by one embodiment of the present invention does not allow applications, including the logging service API 218B, in the OLTP subsystem 210 to write directly to the logstream 116. Therefore, the logging service API 218B uses the message queue 222 to pass the diagnostic messages to a subsystem that allows logstream 116 access. Preferably, an application 224 executing as a long-running batch task drains the message queue 222 and writes the diagnostic messages to the logstream.

In FIG. 2, the batch subsystem 212 also has two applications 226A, 226B, each having an API block 228A, 228B, and two logging service APIs 230A, 230B. As with the example illustrated in the OLTP subsystem 210, application 228A is a legacy application and calls the legacy logging service API 230A. The older logging service API 230A, in turn, passes calls to logging service API 230B.

Applications executing in the batch subsystem 212 can write directly to the logstream 116. Therefore, the logging service API 230B preferably does not use the message queue 222 and instead writes diagnostic messages directly to the logstream 116. In the illustrated embodiment, the logging service API 230B in the batch subsystem 212 does not interact with the alert facility 220 because the functionality of the alert facility can be obtained by writing messages to an MVS system console, although those of ordinary skill in the art will recognize that this capability can be included in alternative embodiments.

FIG. 2 also illustrates two applications for reviewing the data in the logstream 116. A report and extract utility 232 extracts data from the logstream 116 based on user-defined criteria, including, for example, the date, time, business service name, user ID, program name, environment (OLTP or batch), transaction ID, job name, application code, product code, and/or the OLTP region name. An interactive browser 234 utility allows a user to browse real-time logstream data. A preferred embodiment of the browser 234 supports all standard browse features, such as hex on/off, left, right, up, down, etc.

One of ordinary skill in the art will recognize that the various entities illustrated in FIG. 2, such as the applications 214, 228, logging service APIs 218, 230, alert facility 220, message queue 222, logstream 116, and browser 234 are preferably implemented by one or more modules in the computing environment. As used herein, "module" typically refers to machine-executable code and/or data, but may also include associated circuitry, such as processing circuitry, as well as data storage areas (e.g., magnetic disk, tape, CD-ROM, DVD, random-access memory, and/or read-only memory). Thus, it will be appreciated that each of the entities shown in FIG. 2 may be implemented by one or a combination of hardware and software.

Figure 3:
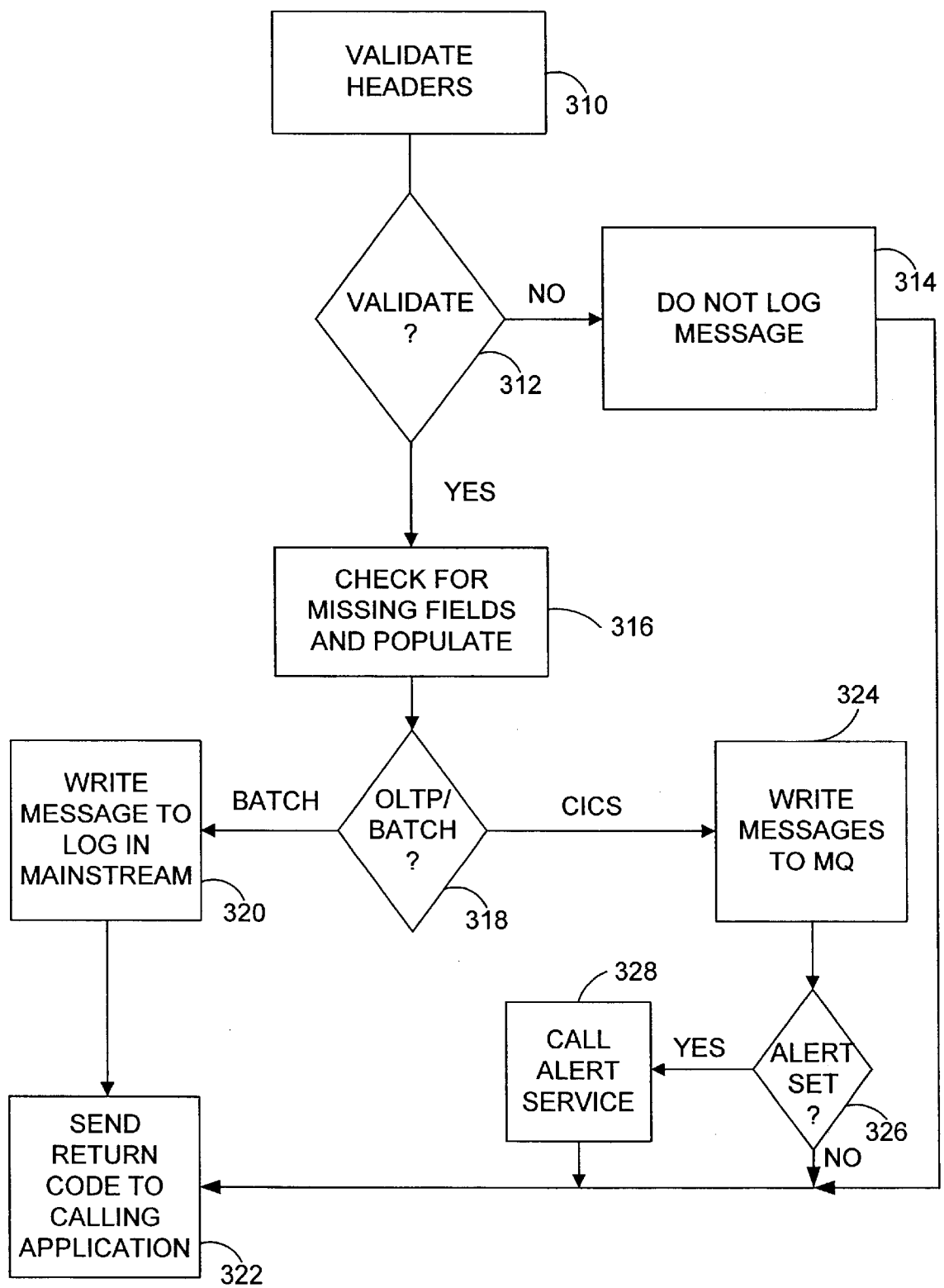
FIG. 3 is a flow chart illustrating steps performed by the logging service according to a preferred embodiment of the present invention.

FIG. 3 is a flow chart illustrating steps performed by the logging service according to a preferred embodiment of the present invention. Those of skill in the art will recognize that the steps illustrated in FIG. 3 can be altered or performed in a different order and remain within the scope of the present invention.

Upon receiving a diagnostic message in the form of a populated API block from an application, the logging service preferably validates 310 the header information in the block. A preferred embodiment of the present invention requires that certain fields in the block contain certain values before the diagnostic message is logged. Specifically, the embodiment verifies the LOG-SERVICE-NAME, LOG-MAJOR-VERSION, and LOG-MINOR-VERSION fields to ensure that the calling application has passed a valid control block. In addition, the present invention preferably checks the LOG-LONG-MSG-IND and LOG-MESSAGE-LEN-QY fields. If the former field is set to "Y", then the latter field must contain a value between one and 32000. If the LOG-MESSAGE-LEN-QY field has a value greater than 32000, then a preferred embodiment of the present invention unilaterally sets the value to zero. Alternatively, if the former field is set to "N", then the latter field must contain a value of zero. Otherwise, the control block is invalid.

Ideally, every call to the logging service will pass this validation. However, incorrectly formatted diagnostic messages can result from programmer or processing errors. Accordingly, the logging service validates the headers to ensure that an incorrectly formatted diagnostic message does not get logged. An alternative embodiment of the present invention tracks the number of incorrectly formatted messages and/or separately logs such messages. In addition, one embodiment of the present invention suppresses duplicate messages from the same calling application within a predetermined time period (e.g., 60 seconds). This suppression is performed to prevent a looping application from flooding the logstream 116 with useless messages.

If the API block validates, the logging service determines 316 whether there are any missing fields in the API block that can be populated by the logging service. Due to programmer error or other reasons, one or more of the fields in the API block may not be filled-in, despite the availability of the relevant information. Possible fields/information include the date/time that the message was generated, the user ID of the application, the OLTP region name where the application started, and/or the batch job name associated with the application. The logging service preferably populates 316 such fields with the missing information, if possible.

The logging service also determines 318 whether the block was received from an application executing in the OLTP or batch subsystem. If the block was received from an application in the batch subsystem, then the logging service preferably writes 320 the diagnostic message directly to the logstream. After completing these steps, the logging service sends 320 a return code to the calling application indicating whether the message was successfully logged.

If the logging service received the diagnostic message from an application in the OLTP subsystem, the logging service preferably writes 324 the message into the message queue. As described above, a drain process preferably reads the messages from the message queue and writes them to a log in the logstream (this interaction is not shown in FIG. 3). The logging service also checks the message to determine 326 whether to notify the alert service. If the appropriate field in the API block is set, then the logging service calls 328 the alert service and passes it the relevant fields in the API block. After the alert service is called, or if the logging service does not notify the alert service, the logging service sends 322 a return code to the calling application.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A system for logging diagnostic messages in a computing environment having a plurality of coupled computer systems, comprising:

a coupling facility for coupling the plurality of computer systems;

a logstream module associated with the coupling facility for storing data generated by the plurality of coupled computer systems; and a logging service module for executing in at least one of the coupled plurality of computer systems, for receiving data representative of a diagnostic message from an application module executing on the computer system on which the logging service module is executing, for examining fields in the data representative of the diagnostic message to determine whether known data is missing, for populating the fields missing known data, and for writing the data representative of the diagnostic message to the logstream module associated with the coupling facility.

2. The system of claim 1, wherein at least one of the plurality of computer systems has a first subsystem from which writing to the logstream module is not permitted and further comprising:

a message queue module accessible from a logging service module executing in the first subsystem for receiving the data representative of the diagnostic message from the logging service module and passing the data through a message queue to a second subsystem from which writing to the logstream module is permitted.

3. The system of claim 2, wherein the first subsystem is an online transaction processing system.

4. The system of claim 1, wherein the logging service module comprises:

an alert module for determining whether to notify an alert facility for issuing an alert responsive to the data representative of the diagnostic message.

5. The system of claim 1, wherein the logging service module further comprises:

a module for examining the data representative of the diagnostic message to determine whether the diagnostic message is valid;

wherein the logging service module writes only valid diagnostic messages to the logstream module.

6. The system of claim 1, further comprising:

a report and extract module for extracting data from the logstream module responsive to selected criteria.

7. The system of claim 1, further comprising:

a browser module for browsing real-time data in the logstream module.

8. The system of claim 1, further comprising:

a legacy logging service module for executing in ones of the coupled plurality of computer systems, for receiving data representative of a second diagnostic message from a legacy application module executing on the computer system on which the legacy logging service module is executing, and for passing the data representative of the second diagnostic message to the logging service module.

9. A method of logging messages in a computing environment, comprising the steps of:

receiving data representative of a diagnostic message in an application program interface block (API) from an application program executing on one of a plurality of computer systems in the computing environment;

determining whether the API block is missing known information;

responsive to a positive determination, populating the API block with the known information; and writing the data representative of the diagnostic message in the API block to a centralized log in the computing environment.

10. The method of claim 9, further comprising the step of:

validating data in the API block to determine whether the diagnostic message is valid;

wherein only valid diagnostic messages are written to the centralized log.

11. The method of claim 9, further comprising the steps of:

determining whether to indicate an alert responsive to the diagnostic message; and indicating the alert responsive to a positive determination.

12. The method of claim 9, further comprising the step of:
    determining a subsystem in which the application program from which the diagnostic message was received is executing.

13. The method of claim 12, wherein responsive to a determination that the application program is executing in an online transaction processing (OLTP) subsystem, the writing step comprises the steps of:
    writing the diagnostic message to a message queue; and
    retrieving the diagnostic message from the message queue in a subsystem other than the OLTP subsystem and writing the diagnostic message to the centralized log.

14. The method of claim 9, wherein the receiving step comprises the steps of:
    receiving the data representative of a diagnostic message from the application program at a legacy logging service; and
    passing the received data representative of the diagnostic message from the legacy logging service to a second logging service, wherein the second logging service is adapted to write the diagnostic message to the centralized log.

15. A computer-readable medium comprising:
    a computer program product having computer-readable code embodied therein for logging diagnostic messages in a logstream associated with a coupling facility coupling a plurality of computer systems, the computer program product comprising:
        a logging service module adapted for executing in at least one of the coupled plurality of computer systems, for receiving data representative of a diagnostic message from an application module executing in the computer system on which the logging service module is adapted to execute, for examining fields in the data representative of the diagnostic message to determine whether known data is missing, for populating the fields missing known data, and for writing the data representative of the diagnostic message to the logstream module associated with the coupling facility.

16. The computer-readable medium of claim 15, wherein at least one of the plurality of computer systems has a first subsystem from which writing to the logstream is not permitted, the computer program product further comprising:
    a message queue module adapted to be accessible from a logging service module executing in the first subsystem and adapted for receiving the data representative of the diagnostic message from the logging service module and passing the data through a message queue to a second subsystem from which writing to the logstream is permitted.

17. The computer-readable medium of claim 15, wherein the logging service module further comprises:
    an alert module for determining whether to notify an alert facility for issuing an alert responsive to the data representative of the diagnostic message.

18. The computer-readable medium of claim 15, wherein the logging service module further comprises:
    a module for examining the data representative of the diagnostic message to determine whether the diagnostic message is valid;
    wherein the logging service module writes only valid diagnostic messages to the logstream.

19. The computer-readable medium of claim 15, the computer program product further comprising:
    a report and extract module for extracting data from the logstream responsive to selected criteria.

20. The computer-readable medium of claim 15, the computer program product further comprising:
    a browser module for browsing real-time data in the logstream.

21. The computer-readable medium of claim 15, the computer program product further comprising:
    a legacy logging service module adapted for execution in at least one of the coupled plurality of computer systems, for receiving data representative of a second diagnostic message from a legacy application module executing on the computer system on which the legacy logging service module is executing, and for passing the data representative of the second diagnostic message to the logging service module.

22. The computer-readable medium of claim 15, wherein the logging service module further comprises:
    a first module for examining the data representative of the diagnostic message to determine whether the diagnostic message is a duplicate message; and
    a second module for selectively discarding duplicate messages.

* * * * *